United States Patent [19]
Wakao et al.

[11] Patent Number: 6,035,960
[45] Date of Patent: *Mar. 14, 2000

[54] MOTORIZED POWER STEERING CONTROL DEVICE

[75] Inventors: Hirokazu Wakao, Kani; Yoshinori Kogiso, Mizunami; Akira Endo, Gifu-ken, all of Japan

[73] Assignee: Kayaba Industry Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,873

[22] Filed: Jan. 2, 1996

[30] Foreign Application Priority Data

Jan. 26, 1995 [JP] Japan ................................. 7-029944

[51] Int. Cl.$^7$ ........................................................ B62D 5/04
[52] U.S. Cl. ................................................ 180/446; 701/41
[58] Field of Search ................................. 180/443, 446, 180/445, 412, 413; 701/41

[56] References Cited

U.S. PATENT DOCUMENTS

| | | | |
|---|---|---|---|
| 4,751,978 | 6/1988 | Drutchas | 180/446 |
| 4,756,375 | 7/1988 | Ishikura et al. | 180/446 |
| 4,875,539 | 10/1989 | Abukawa et al. | 180/446 |
| 4,972,320 | 11/1990 | Sugiura et al. | 180/446 |
| 5,078,225 | 1/1992 | Ohmura et al. | 180/446 |
| 5,097,420 | 3/1992 | Morishita | 180/446 |
| 5,101,922 | 4/1992 | Ohmura | 180/445 |

*Primary Examiner*—Paul N. Dickson
*Assistant Examiner*—Avraham H. Lerner
*Attorney, Agent, or Firm*—Steinberg & Raskin, P.C.

[57] ABSTRACT

A motorized power steering control device capable of reducing arrangement of an external wiring and simplifying a travel condition detecting unit, to thereby reduce a manufacturing cost of the device. A controller has an alternator pulsation detecting circuit and a power circuit arranged therein. The power circuit selectively controls a main voltage or a backup voltage to apply it to a control circuit. The control circuit operates an engine speed depending on a pulsation frequency of an alternator, to thereby actuate the power circuit to apply the main voltage to the control circuit when the engine speed is at a predetermined level or above and apply the backup voltage thereto when it is at the predetermined level or below.

5 Claims, 3 Drawing Sheets

MOTORIZED POWER STEERING CONTROL DEVICE

BACKGROUND OF THE INVENTION

This invention relates to a motorized power steering control device, and more particularly to a motorized power steering control device which is adapted to be fed with power assisting force by driving of an electrical motor.

A conventional motorized power steering control device is generally constructed in such a manner as shown in FIG. 3. More particularly, the conventional motorized power steering control device includes a controller C for controlling an electric motor m, which controller C is connected through a drive wiring 9 to a battery B for driving the electric motor m. The battery B has an alternator 13 connected thereto. The alternator 13 is connected to an engine (not shown), resulting in acting as an AC generator adapted to operate depending on rotation of the engine and exhibit a rectifying function.

The drive wiring 9 has a wiring 11 for the controller C branched therefrom, which wiring 11 is connected through an ignition switch IC to a power circuit 10 arranged in the controller C. The power circuit 10 has a backup wiring 12 connected directly thereto without interposing the ignition switch IG between the power circuit 10 and the backup wiring 12.

The power circuit 10 constructed as described above acts to apply a main voltage to a computer control circuit 2 when the ignition switch IC is turned on and apply a backup voltage thereto when it is turned off. The backup voltage permits a backup current of a required level to be fed to the controller C, to thereby permit storage in the controller C to be kept, even when the ignition switch IG is turned off.

The conventional motorized power steering control device also includes a torque sensor 3, a vehicle velocity sensor 4 and an engine speed sensor 5 each connected to the controller C so as to act as a travel condition detection means.

The controller C generally includes a drive circuit 1 for controlling a voltage applied to the electric motor m and the control circuit 2 for controlling the drive circuit 1.

The above-described drive wiring 9 is connected to the drive circuit 1 of the controller C, to thereby permit the electric motor m to be connected to the drive circuit 1 therethrough. The control circuit 2 for controlling the drive circuit 1 is connected to the power circuit 10.

The torque sensor 3, vehicle velocity sensor 4 and engine speed sensor 5 are connected through interfaces 6, 7 and 8 arranged in the controller C to the control circuit 2, respectively.

The torque sensor 3 is arranged so as to detect steering torque inputted to a handle of a vehicle and the vehicle velocity sensor 4 acts to detect a velocity or speed of the vehicle. The control circuit 2 actuates the drive circuit 2 depending on the steering torque and vehicle velocity thus detected by the torque sensor 3 and vehicle velocity sensor 4, so that the drive circuit 1 varies a voltage applied to the electric motor m.

Also, the engine speed sensor 5 detects an engine speed of the vehicle. More specifically, for example, the engine speed sensor 5 may be constructed so as to actuate the power circuit 10 when an engine speed is not increased or an engine is not driven irrespective of turning-on of the ignition switch IG. This permits a backup voltage to be applied to the control circuit 2, resulting in the motorized power steering control device being kept from exhibiting its control function and consumption of power stored in the battery B being restrained to prevent full discharge of the battery B.

In the conventional motorized power steering control device constructed as described above, the battery B is used as a power supply for driving the electric motor m, as well as a power supply for the controller C. Also, the conventional motorized power steering control device is constructed so as to permit on-off operation of the controller C to be carried out in association with the ignition switch IG for driving the engine, so that starting of the engine leads to application of a main voltage to the control circuit 2. This results in the motorized power steering control device exhibiting its control function.

Such on-off operation of the controller C in association with the ignition switch IG requires that the controller wiring 11 comprises an external wiring. Unfortunately, this leads to an increase in manufacturing cost of the motorized power steering control device and requires a significant space for mounting of the motorized power steering control device in a vehicle.

Further, the control circuit 2 of the controller C, as described above, has the three sensors or the torque sensor 3, vehicle velocity sensor 4 and engine speed sensor 3 connected thereto so as to act as the travel condition detecting means. Such construction requires arrangement of wirings for the three sensors, interfaces therefor and the like, leading to a further increase in manufacturing cost of the device and complication in structure thereof.

SUMMARY OF THE INVENTION

The present invention has been made in view of the foregoing disadvantages of the prior art.

Accordingly, it is an object of the present invention to provide a motorized power steering control device which is capable of reducing external wirings to simplify a structure of the device and reduce a manufacturing cost of the device.

It is another object of the present invention to provide a motorized power steering control device which is capable of reducing members for a travel condition detecting means to decrease a manufacturing cost of the device.

It is a further object of the present invention to provide a motorized power steering control device which is capable of reducing power consumption, to thereby decrease energy loss.

In accordance with the present invention, a motorized power steering control device is provided. The motorized power steering control device includes an electric motor for providing steering assisting force, a controller for controlling the electric motor, a battery connected to the electric motor and controller, an alternator arranged in association with an engine and connected to the battery, and a travel condition detecting means connected to the controller.

The controller includes a drive circuit for varying a voltage applied to the electric motor and a control circuit connected to the travel condition detecting means for controlling the drive circuit depending on a travel condition detected. The motorized power steering control device also includes an alternator pulsation detecting circuit arranged in the controller and a power circuit arranged in the controller for applying a main voltage or a backup voltage to the control circuit while selectively controlling the main voltage or backup voltage. The control circuit carries out calculation of an engine speed depending on a pulsation frequency of the alternator and actuates the power circuit to permit the main voltage to be applied to the control circuit when the engine speed is at a predetermined level or above and permit the backup voltage to be applied to the control circuit when the engine speed is at the predetermined level or below.

Thus, in the present invention, the alternator pulsation detecting circuit functions to detect pulsation of the alternator, so that the control circuit calculates the engine speed depending on a frequency of the pulsation. As a result, the control circuit actuates the power circuit to permit the main voltage to be applied to the control circuit when the engine speed is at the predetermined level or above. This results in the motorized power steering control device of the present invention exhibiting its control function. When the engine speed is below the predetermined level, the backup voltage is permitted to be applied to the control circuit, to thereby keep the device of the present invention from exhibiting the function.

In a preferred embodiment of the present invention, the travel condition detecting means comprises only a torque sensor and the control circuit estimates a vehicle velocity and the engine speed depending on pulsation of the alternator. Such construction permits the electric motor to be depending on conditions including steering torque, resulting in the electric motor exhibiting optimum power assisting force.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a motorized power steering control device according to the present invention will be described hereinafter with reference to FIGS. 1 and 2.

Figure 1:
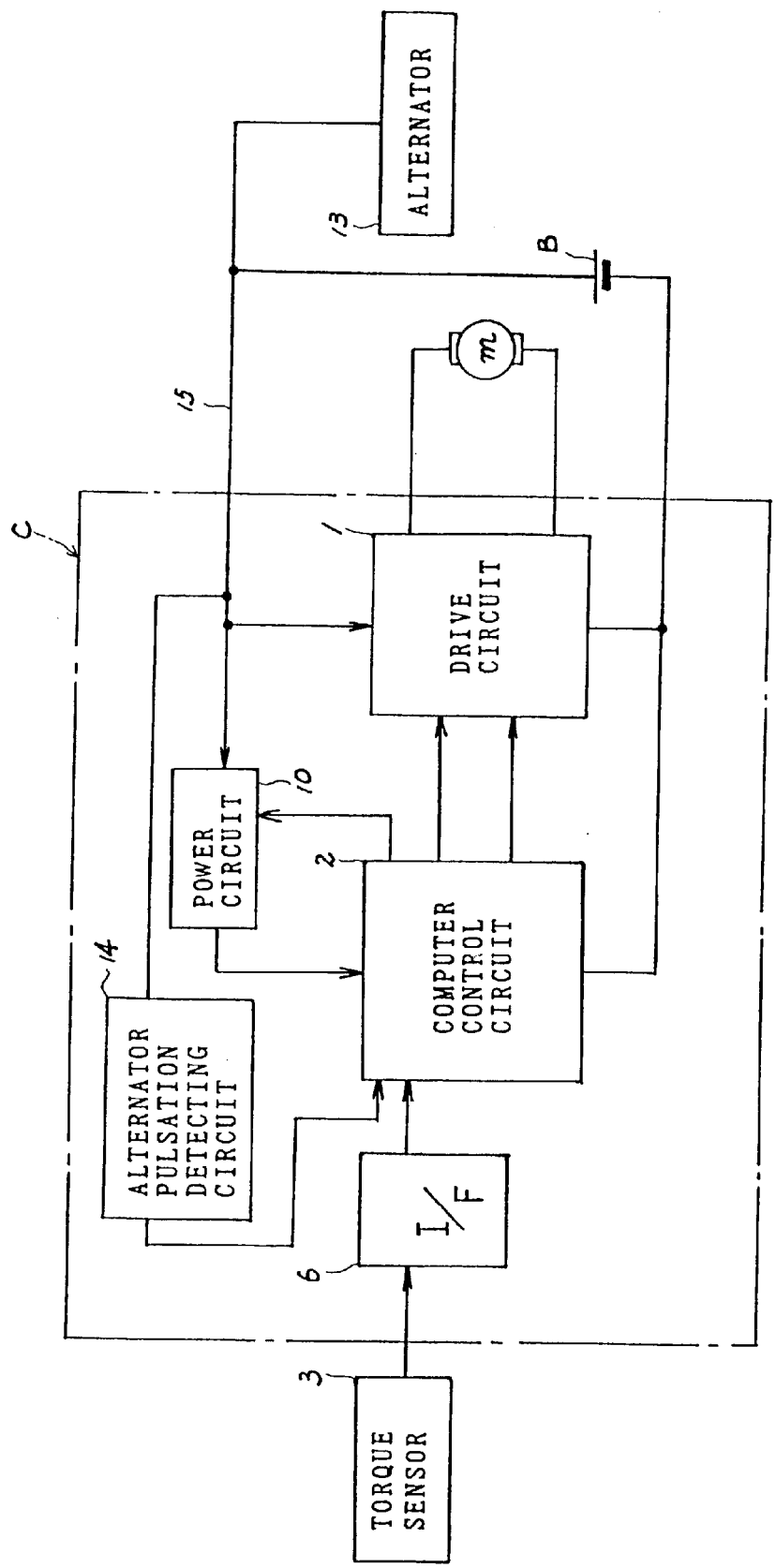
FIG. 1 is a circuit diagram showing an embodiment of a motorized power steering control device according to the present invention.
Figure 2:
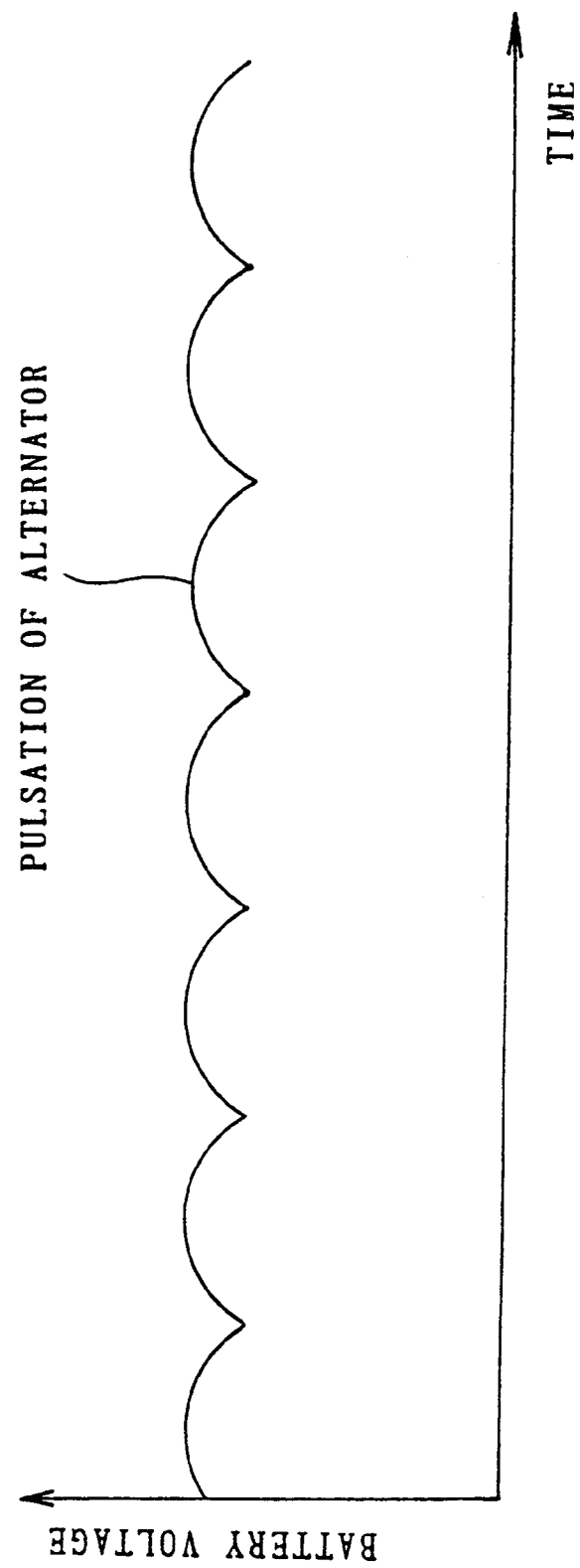
FIG. 2 is a graphical representation showing pulsation characteristics of an alternator incorporated in the motorized power steering control device of FIG. 1.

Referring to FIG. 1, an embodiment of a motorized power steering control device according to the present invention is illustrated. A motorized power steering control device of the illustrated embodiment includes a controller C having an alternator pulsation detecting circuit 14, which is adapted to detect pulsation of an alternator 13. The alternator 13 is constructed so as to generate an AC electricity or AC power depending on rotation of an engine of a vehicle and rectify the electricity thus generated, which is then outputted from the alternator 13. The AC electricity generated is caused to have a frequency proportional to an engine speed of the vehicle or the number of revolutions of the engine. This results in a DC current rectified having a pulsation frequency proportional to the engine speed as shown in FIG. 2.

A pulsation signal detected thus by the alternator 13 is inputted to a computer control circuit 2, which functions to calculate the engine speed depending on the pulsation frequency.

The engine speed is calculated according to the following expression:

$$N = a \cdot \Omega / b \cdot c$$

wherein

N is an engine speed (rpm);

$\Omega$ is a pulsation frequency (Hz) of the alternator 13;

a is a constant;

b is a pulsation coefficient of the alternator 13 (the number of pulsations generated by one rotation of the alternator 13); and c is a pulley ratio (a ratio in the number of revolutions between the engine and the alternator 13).

Also, the engine speed is proportional to a vehicle velocity or a velocity of the vehicle, so that the control circuit 2 may calculate the vehicle velocity based on the pulsation frequency.

Further, the controller C is adapted to control a power circuit 10 depending on results of the operation by the control circuit 2. The power circuit 10 is connected to the alternator 13 and a battery B through a wiring 15 connected to a drive circuit 1 such that the alternator pulsation frequency and the battery voltage for driving the motor m are passed through the common wire and the alternator pulsation frequency is thus superimposed on the battery voltage. The power circuit 10 functions to selectively control a main voltage or a backup voltage, to thereby permit it to be applied to the control circuit therethrough. More particularly, when an engine speed or the number of revolutions of the engine obtained by the operation of the control circuit 2 is at a predetermined level or below, the power circuit 10 operates depending on a signal fed thereto from the control circuit 2, to thereby cause a backup voltage to be applied to the control circuit 2. This results in application of a voltage to an electric motor m from the drive circuit 1 being interrupted, so that only data required which were obtained prior to the interruption being stored in the control circuit 2.

On the contrary, when the engine speed is increased to the predetermined level or more, the control circuit 2 feeds the power circuit 10 with a signal, which permits the power circuit 10 to carry out operation for applying a main voltage to the control circuit 2. This permits operation of the motorized power steering control device of the illustrated embodiment to be started, resulting in required power assisting being carried out.

As will be noted from the foregoing, the illustrated embodiment is so constructed that starting of the engine is detected depending on pulsation of the voltage and the engine speed and vehicle velocity are calculated on the basis of the pulsation. Such construction eliminates the above-described association between the ignition switch IG and the controller C which is required in the prior art, as well as arrangement of the velocity sensor 4 and engine speed sensor 5 required in the prior art. In the illustrated embodiment, the wiring 15 for the drive circuit 1 is used for connecting the control circuit 2 to the power supply.

Figure 3:
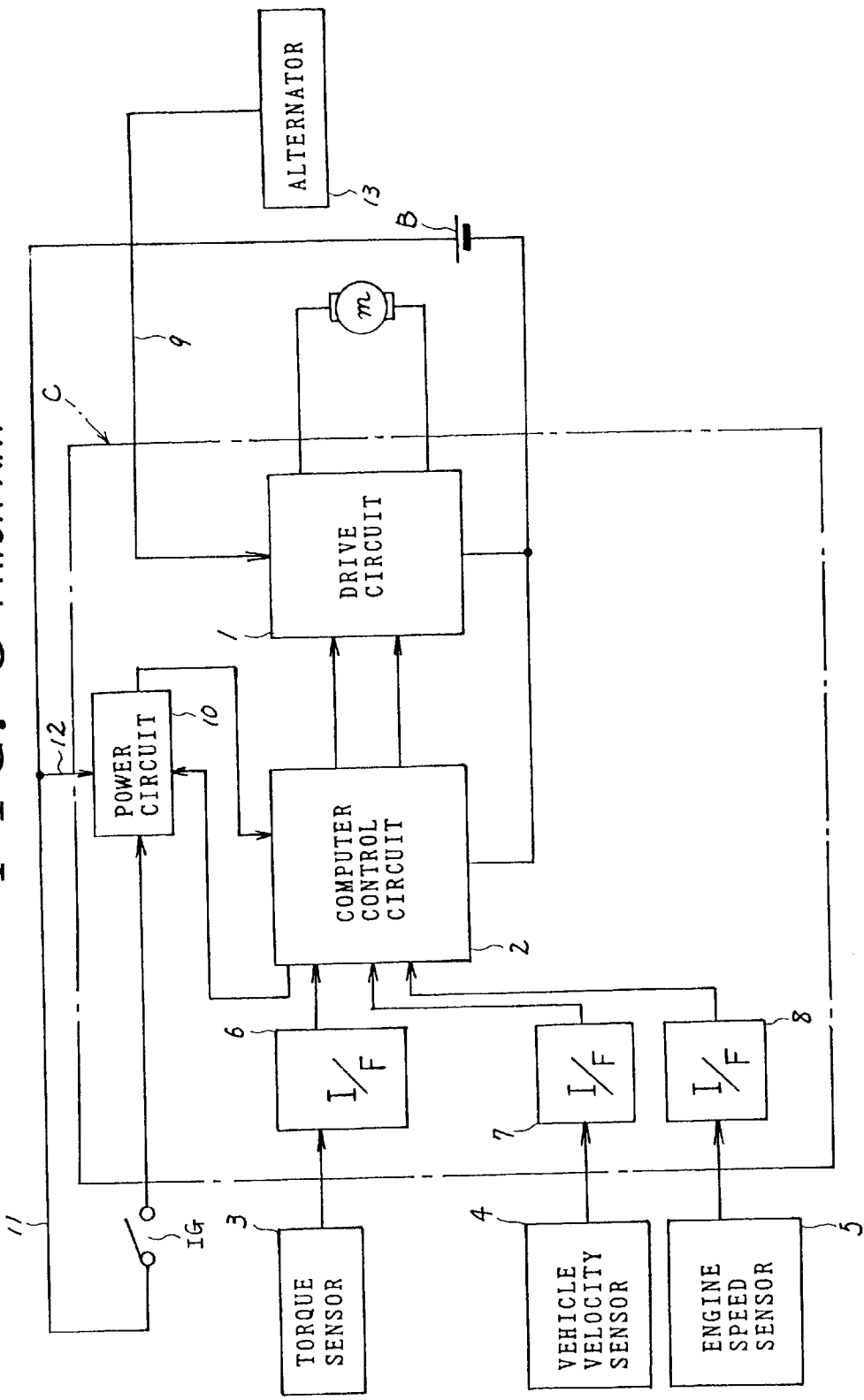
FIG. 3 is a circuit diagram showing a conventional motorized power steering control device.

The remaining part of the illustrated embodiment may be constructed in substantially the same manner as the conventional motorized power steering control device described above with reference to FIG. 3.

Now, the manner of operation of the motorized power steering control device of the illustrated embodiment constructed as described above will be described hereinafter with reference to FIGS. 1 and 2.

First, when the engine is kept from being driven, an output voltage of the alternator 13 is kept free from pulsation. At this time, the power circuit 10 operates depending on an output signal of the control circuit 2, to thereby cause a backup voltage to be applied to the control circuit 2. More specifically, when driving of the engine is stopped, the control circuit 2 causes the device of the illustrated embodiment to be kept from exhibiting a motorized power steering control function, to thereby restrain unnecessary consumption of power stored in the power supply. At this time, power required for storing required data or information in the control circuit 2 is fed through the power circuit 10 thereto.

When driving of the engine is started, the alternator pulsation detecting circuit 14 detects pulsation of the alternator 13 and the control circuit 2 calculates an engine speed, a vehicle velocity and the like. When the engine speed is at a predetermined level or below, a backup voltage is kept applied to the control circuit 2 to prevent the motorized power steering control device from carrying out a motorized power steering control function. More specifically, in the illustrated embodiment, the predetermined level of the engine speed is set to be about 40 rpm, thus, it is judged that an engine speed of about 40 rpm or below causes the engine to be at a state of being stopped.

Therefore, when the engine is at a state immediately before it is stopped or the engine is stopped irrespective of the ignition switch IG being kept turned on, it is judged that a voltage applied to the control circuit 2 is not required to start the motorized power steering control device, resulting in being a backup voltage. This permits power consumption to be significantly reduced, to thereby lead to a decrease in energy loss.

When the engine speed is increased to the predetermined level or more, the power circuit 10 carries out an operation depending on a signal generated from the control circuit 2, to thereby permit a main voltage to be applied to the control circuit 2 therethrough. The main voltage thus applied permits the control circuit 2 to start the motorized power steering control device 2 of the illustrated embodiment, resulting in the device exhibiting its control function.

More specifically, the torque sensor 3 detects steering torque. Also, an engine speed of a vehicle is calculated depending on pulsation of the alternator 13. In addition, a velocity of the vehicle is estimated depending on the engine speed thus estimated. Further, the control circuit 2 controls the drive circuit 1 depending on traveling of the vehicle, so that the drive circuit 1 controls application of a voltage to the electric motor m, to thereby permit steering force to be assisted.

As can be seen from the foregoing, the motorized power steering control device of the present invention eliminates arrangement of an external wiring for an ignition switch, resulting in a decrease in manufacturing cost of the device and space saving being accomplished. Also, in the present invention, when an engine speed is at a predetermined level or below, it is judged that the motorized power steering control device is not required to exhibit its control function, resulting in only a backup voltage being applied to the control circuit, leading to a decrease in power consumption and therefore a decrease in energy loss.

Also, in the motorized power steering control device of the present invention, only the torque sensor is required for the travel condition detecting means, resulting in arrangement of such vehicle velocity and engine speed sensors as required in the prior art being eliminated. This leads to a further decrease in manufacturing cost of the device.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A motorized power steering control device comprising:

an electric motor for providing steering assisting force;

a controller for controlling said electric motor;

a battery connected to said electric motor and said controller for driving said motor;

an alternator arranged in association with an engine and connected to said battery;

a travel condition detecting means connected to said controller;

said controller including a drive circuit for varying a voltage applied to said electric motor and a control circuit connected to said travel condition detecting means for controlling said drive circuit depending on a travel condition detected;

an alternator pulsation detecting circuit arranged in said controller for detecting a pulsation frequency of the alternator;

a power circuit arranged in said controller for applying a main voltage or a backup voltage to said control circuit while selectively controlling said main voltage or backup voltage, the alternator and said battery being fixedly and simultaneously coupled through a common wire to said power circuit such that the alternator pulsation frequency is superimposed on the battery voltage;

each of said control circuit, power circuit and alternator pulsation detecting circuit being integrally arranged and connected within said controller for eliminating an external connection between an ignition switch and said controller;

said control circuit being structured and arranged to calculate the speed of the engine based on the detected pulsation frequency of the alternator;

said control circuit actuating said power circuit to permit the main voltage to be applied to said control circuit when the calculated engine speed is at a predetermined level or above and permit the backup voltage to be applied to said control circuit when the calculated engine speed is at the predetermined level or below.

2. A motorized power steering control device as defined in claim 1, wherein said travel condition detecting means comprises only a torque sensor; and said control circuit estimates a vehicle velocity and calculates the engine speed depending on pulsation of said alternator.

3. A motorized power steering control device as defined in claim 1, wherein said control circuit calculates the engine speed according to the following equation:

$$N=[a][\Omega/b][c]$$

wherein N is the calculated engine speed (rpm), $\Omega$ is said pulsation frequency (Hz) of said alternator, a is a constant, b is a pulsation coefficient of said alternator, and c is a pulley ratio.

4. A motorized power steering control device as defined in claim 1, wherein the predetermined level of the calculated engine speed is about 40 rpm.

5. A motorized power steering control device as defined in claim 1, wherein said control circuit controls said drive circuit depending on the detected travel condition such that said drive circuit controls an application of a voltage to said electric motor to thereby permit a steering assistance force to be provided.

* * * * *